Dec. 5, 1944.  R. F. BELVEAL  2,364,185
GAUGING MACHINE
Filed May 26, 1943  2 Sheets-Sheet 1
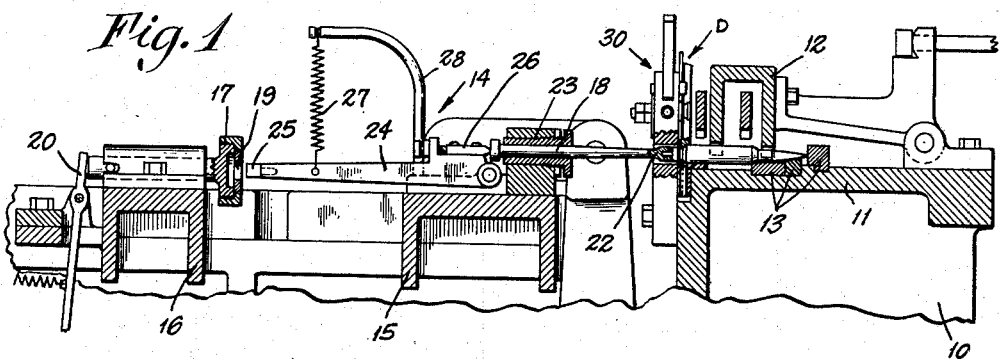
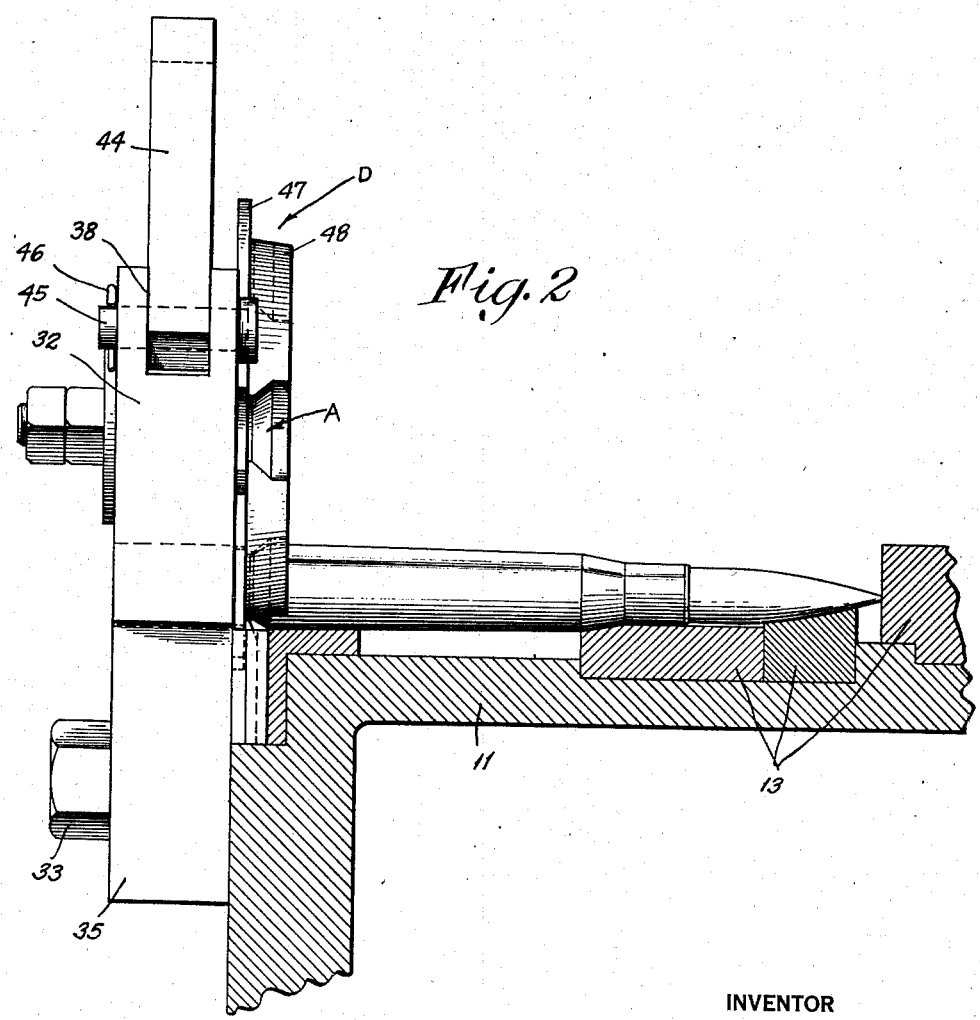
INVENTOR
Robert F. Belveal
BY
Harold L. Gammons
AGENT Dec. 5, 1944.   R. F. BELVEAL   2,364,185
GAUGING MACHINE
Filed May 26, 1943   2 Sheets-Sheet 2

INVENTOR
Robert F. Belveal
BY
Harold L. Gammons
AGENT

Patented Dec. 5, 1944

2,364,185

UNITED STATES PATENT OFFICE 2,364,185

GAUGING MACHINE

Robert F. Belveal, Denver, Colo., assignor to Remington Arms Company, Inc., Bridgeport, Conn., a corporation of Delaware Application May 26, 1943, Serial No. 488,494

10 Claims. (Cl. 209—88)

This invention relates to a gauging machine, and, in particular, to a new and improved device for gauging cartridges, but it will be understood that the invention is not limited to such use.

Moreover, the gauging device of this invention, an exemplary movement of which is described below and illustrated in the drawings, is one which is especially adapted for use on a standard cartridge gauging and weighing machine of the type disclosed in the Candee patent, No. 1,783,404.

Briefly, the general purpose of this type of machine is to perform a series of gauging or inspection operations on the cartridges as they are being fed continuously through the machine and upon discovery of a defective cartridge to subsequently reject that particular cartridge into a group of similarly defective cartridges and without interruption in the gauging and inspection of succeeding cartridges. The gauging means include devices for supporting the cartridges while they are being inspected for length and head thickness.

Of these inspection operations, head thickness gauging, by which is meant gauging the thickness of metal between the extraction groove and the head end of the case, hereinafter termed the rim, has not always proven sufficiently comprehensive to meet the high standards set by the Ordnance Inspection. This contingency has been attributed to the fact that, while the cartridge head is being inspected, only a relatively small portion of the periphery of the cartridge rim is in contact with the gauging elements. Consequently, defective heads, such as those having small nicks or burrs at a point on the periphery of the rim remote from the gauging elements at the moment of inspection, are allowed to pass undetected through the machine.

An object of the present invention is to gauge the thickness of a substantially disk-shaped article by supporting substantially the entire periphery of the article in contact with a gauging device. A further object is to provide an improved head thickness gauge for cartridge case inspection machines. A still further object is to provide a cartridge case head thickness gauge constructed and arranged to contact substantially the entire periphery of the head at the moment of inspection.

Other objects, features and advantages of the invention will be obvious from the specification and accompanying drawings.

In the drawings:

Fig. 1 is a diagrammatic fragmentary side elevation partly in section of a standard cartridge gauging and weighing machine showing the head thickness gauge of this invention.

Fig. 2 is an enlarged side elevation of the thickness gauge shown in Fig. 1.

Figure 3:
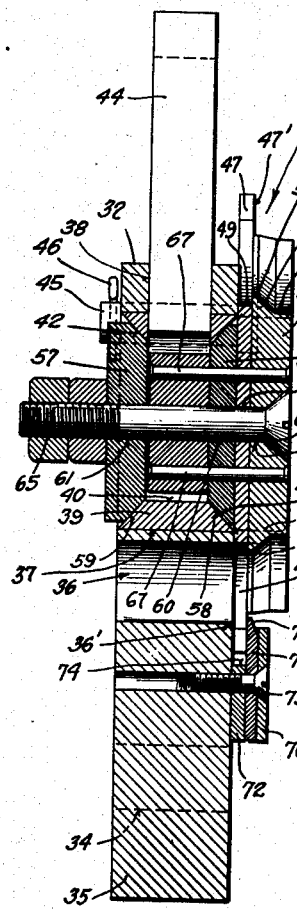
Fig. 3 is a side elevation in section of the thickness gauge.

Referring to Fig. 1, 10 is the base portion of the feed table 11 along which the cartridges are continuously fed in a direction at substantially right angles to their length by suitable feed means, indicated generally at 12. The table 11 carries suitable guide blocks, indicated generally at 13, upon which the cartridges roll to and between the several inspection stations.

The inspection mechanism, indicated generally at 14 and described in detail in the above-mentioned Candee patent, is used in the Candee machine for gauging the length of cartridges but has been found to be particularly adapted for testing cartridge head thickness when used with the improved gauging means of this invention.

Briefly, the inspection mechanism comprises a pair of reciprocating slide 15 and 16 actuated by suitable means (not shown) and adapted to carry a gauging plate 17 and gauging rod 18 respectively. The gauging plate has an opening 19 therethrough at the rear end of which is a trip lever 20 for segregating the defective cartridges into their respective groups. The gauging rod 18 has a hardened button 22 at its front end and is slidingly mounted in a sleeve 23 which is supported on the slide 15. Journalled on the latter is a gauging lever 24 having a hardened plug 25 at its rear end and provided with a gauging finger 26 at its front end, the pointed end of the finger being maintained in contact with the rear end of the rod 18 by a spring 27 supported on a post 28. It will be understood that when a cartridge is moved into the inspection station and held by the transfer element 12, the slide 15 moves forward carrying with it the gauging rod 18, the button 22 of which contacts the head of the case. If the forward displacement of the rod 18 is normal, as, for instance, when the length of the case is correct, then no movement is imparted to the pivoted gauging lever 24. If, however, the displacement of the rod 18 is above or below the normal movement, the end 25 of the lever 24 will be swung out of alignment with the aperture 19 of the gauge plate 17, and, consequently, when the latter is carried forward by the slide 16, it strikes the hardened plug 25 there-upon actuating the trip lever 20 to reject the cartridge being inspected.

The improved head thickness gauging device of this invention is indicated generally at 30 and comprises means for supporting the head of a cartridge case so that any variation in head thickness from allowable tolerances will be indicated by abnormal displacement of the gauging rod 18.

Referring to Figs. 1 and 2, the head thickness gauging device 30 comprises a substantially rectangular base block or post 32 mounted vertically on the base 10 of the machine adjacent the top of the table 11 by a pair of bolts 33 which pass through drilled holes 34 in an apron portion 35 of the base block 32. A smooth bored hole 36, slightly greater in diameter than the diameter of the head of a cartridge case to be gauged, is drilled horizontally through the base block on its vertical center line, the horizontal axis of the hole being substantially in axial alignment with the reciprocating rod 18 and of sufficient diameter to accommodate the button 22.

Figure 4:
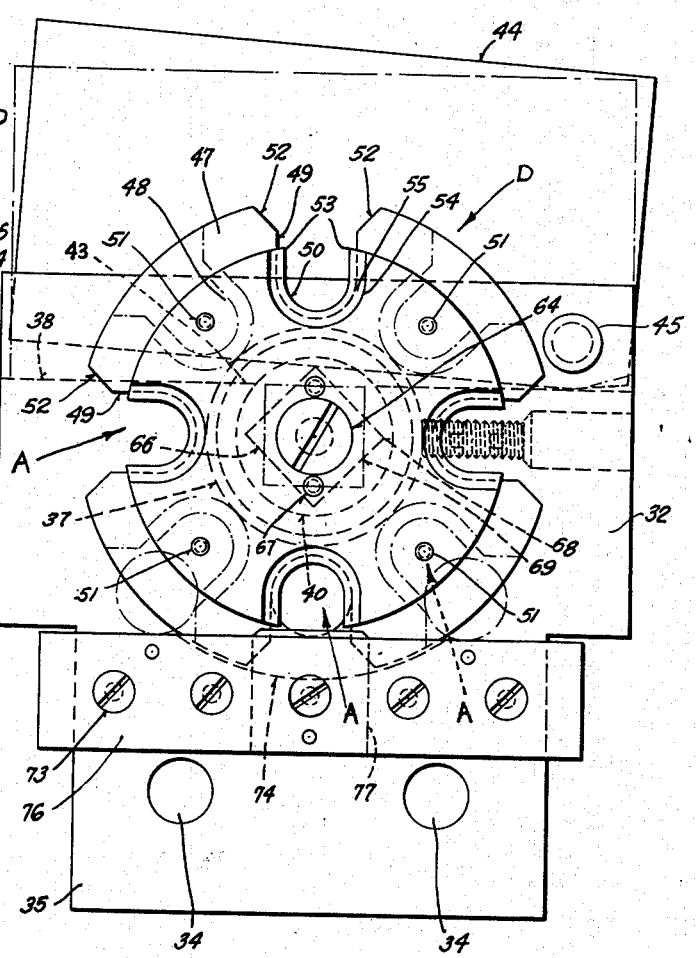
Fig. 4 is a front elevation of the thickness gauge.

Directly above the hole 36 of the base block is a second smooth bored hole 37 which is considerably larger than the hole 36 and which intersects a substantially rectangular groove or slot 38 cut or otherwise formed in the upper edge of the base block 32. The slot 38 extends transversely across the entire width of the base block or post as shown in Figs. 3 and 4. The hole 37 is adapted to accommodate a disk-shaped bearing block 39 comprising hard tool steel or other suitable material sweated or otherwise fixedly secured in the hole 37. The block 39 is provided with a horizontal axially drilled hole 40 having bevelled edges 42 on its opposite faces. The upper portion of the bearing block 39, which intersects the transverse groove 38 of the base block when the bearing block and base block are assembled, as shown, is provided with a transverse groove 43 which is substantially equal in width to the width of the groove 38; moreover, the bottom surfaces of the two grooves lie in substantially the same horizontal plane, as shown in Fig. 4.

Mounted to move vertically in the grooves 38 and 43 of the base block and bearing block respectively is a weight comprising a substantially rectangular block 44 pivotally secured in the groove 38 by a pin 45 which passes through aligned apertures drilled in the right hand edge of the base block and in the adjacent lower corner of the weight block 44. The pin may be secured in the block by a suitable fastening means such as the cotter pin 46.

The bearing block 39 constitutes means for rotatably supporting a discoidal member D for gauging the thickness of the cartridge case heads. The member D comprises a pair of superposed gauging disks 47, 48 secured together, as shown in Figs. 3 and 4, by suitable fastening means such as the four rivets 51 and provided with gauging apertures indicated generally at A comprising concentrically arranged substantially U-shaped apertures 49 and 50 respectively. Four such apertures A, spaced substantially 90° apart on the peripheries of the gauging disks, are shown in the present embodiment, but it will be understood that modifications thereof may be made within the scope of the appended claims.

The apertures 49 of the gauging disk 47 are provided with relatively wide flaring or bevelled entrance edges 52 while the width of each aperture, between its parallel sides, and which corresponds to the diameter of the semicircular portion of the aperture, is slightly larger than the outside diameter of a standard cartridge head. The depth of the aperture 49 is substantially equal to the thickness of the disk 47 which is somewhat greater than the thickness of the rim of a standard cartridge case. The outer face 47' of the disk 47 is ground to provide a smooth surface adapted to make a close uniform contact with the adjacent ground surface of the complementary gauging disk 48.

The latter is somewhat smaller in diameter than the disk 47 and is substantially three times its thickness as shown in Fig. 4. The apertures 50 of the disk 48 are located in the inner face of the disk, that is to say, in that face which is in contact with the outer face 47' of the disk 47, and have substantially square entrance edges 53. The width of each aperture 50 between its substantially parallel sides corresponds to the diameter of its semicircular portion, is less than the width of the corresponding concentric aperture 49 of the gauging disk 47 and is substantially equal to the diameter of the extraction groove of a standard cartridge case. As shown in Fig. 3, each aperture 50 is provided with a counterbored portion 54 formed in the outer face of the disk 48 and having bevelled shoulders 55 which are adapted to intersect the aperture 50 in such a manner that the thickness of the walls of each aperture 50 is slightly less than the width of the extraction groove of a standard cartridge case. Moreover, the slope of the bevelled shoulders 55 is flatter than the slope of the shoulders of a standard case for the purpose hereinafter described.

As shown, the profile of each composite aperture A of the discoidal member D formed by assembling the gauging disks 47 and 48 in their cooperative relationship, shown in section in Fig. 3, corresponds, in general, to the profile of the head of a cartridge case. Specifically, the aperture 49 is sufficiently large to accommodate the head of a case of maximum head dimensions while the semiannular lip or flange formed by the walls of the aperture 50 engages securely in the extraction groove of the case, and provides a supporting means adapted to engage substantially 180° of the rim of the case. It will be noted, however, that, although the case is held positively by the lip 50 from longitudinal movement to the right, as seen in Fig. 2, the case may be displaced slightly to the left inasmuch as the shoulders of the case do not normally contact the bevelled shoulders of the aperture 50.

The gauging member D is rotatably mounted in the hole 40 of the bearing block by a pair of steel disk-like bearing plates 56 and 57 of substantially equal dimensions, each being provided with an annular bevelled edge 58 and 59 respectively, adapted to be mounted in rotating engagement with a cooperating annular bevelled edge 42 of the bearing block 39.

The bearing plate 56 is formed integral with or may be otherwise secured on the inner face of the gauge disk 47; moreover, both bearing plates are provided with horizontally drilled holes 60 and 61 in alignment with axially drilled holes 62 and 63 respectively of the assembled gauge disks 47 and 48. The hole 63 of the gauge disk 48 is provided with a countersink in its outer face for seating the kerfed head 64 of a bolt 65 which is adapted to pass through the axially aligned holes of the gauging member D and bearing plates and is provided at its opposite threaded end with a pair of nuts for drawing the gauging member and the bearing plates together in rotatably assembled position on the bevelled edges 42 of the bearing block 39.

The gauging member D is normally immobile but is adapted to be positively rotated by the interlocking of a cartridge case in a gauging aperture A of the member D. This is accomplished as a cartridge is being moved across the table from left to right (Fig. 4) at substantially right angles to the axis of the member by the feed means 12.

However, as a cartridge moves from its gauging position or station, shown in full lines in Fig. 4, and is advanced across the table 12, the interlocked gauging aperture A of the member D moves out of engagement with the cartridge when the member has been rotated through an angle of substantially 45°.

In this position, as shown by the dotted lines, and hereinafter termed the immobile position of the gauging member, the next or following gauging aperture, which is approaching the gauging station, may not be interlocked sufficiently with the next succeeding cartridge case to insure rotation of the gauging member D as the case is moved into gauging position.

Hence suitable means are provided for augmenting the rotary motion of the gauging member to carry it beyond its immobile position and thus rotate an aperture A thereof sufficiently to interlock with the cartridge being advanced into gauging position and comprises the above described pivoted weight 44 and a substantially rectangular hardened steel block 66. The latter is drilled axially so as to be mounted, as shown, on the bolt or shaft 65 in the aperture 40 of the bearing block 39 between the spaced bearing plates 56 and 57. The block 66 is fixedly secured to the bearing plate 56 of the gauging member by means of a pair of rivets 67 or other suitable fastening means.

It will be clear that when a gauging aperture A of the member D is at the gauging station, a corner 68 of the block 66 is engaged by the lower edge of the weight 44. Consequently, as the aperture is moved away from the gauging station thereby rotating the member D counterclockwise, see Fig. 4, the obliquity of the pivotal weight 44 with respect to the corner 68 of the block produces a torque which augments the rotation of the member and carries it past its immobile position whereby the approaching aperture A successfully interlocks with the next succeeding cartridge case.

Suitable cartridge case head supporting means are provided to cooperate with the gauging apertures A of the discoidal member D when the apertures are in gauging position to further increase the area of the gauging surfaces contacting the rim of the cartridge head and comprises a substantially rectangular blade 70 which is bolted to the side of the base block 32 beneath the gauging member D, its upper edge being in substantially the horizontal plane of the cartridge case feed track 13. The blade is spaced from the face of the tongue portion 35 of the base block by a substantially rectangular spacer plate 72, the thickness of which corresponds substantially to the thickness of the gauge disk 47. The spacer plate 72 extends longitudinally across the width of the base block being secured thereto by a plurality of rivets 73 or other fastening means and is provided with an arcuate cut out 74 in its upper edge which, taken in conjunction with the adjacent substantially vertical faces of the apron 35 and gauge blade 70, constitutes a guide slot having an arcuate base for accommodating the lower peripheral portion of the rotatable gauging member D. The upper edge of the gauge blade 70 is provided with a bevelled lip or flange 75 which is straight but shaped in cross section substantially like the bevelled edge of the semiannular lip of the U-shaped aperture 50. Moreover, the lip 75 lies opposite and in substantially the vertical plane of the semiannular lip 50 when the latter is in gauging position and is spaced therefrom vertically a distance which corresponds substantially to the diameter of the extraction groove of a standard cartridge case. The two lips 50 and 75 together constitute gauging surfaces which engage substantially 75% of the rim portion of the cartridge case head when the latter has been entered into a gauging aperture A of the discoidal member D for inspection as described below. A suitable face plate 76 is secured on the front of the spacing plate 72 by the rivets 73 and is recessed on its inner face as at 77 to form a substantially rectangular seat for the gauge blade 70.

In operation, as the cartridge case is fed along the table or track 13 to the gauging device by the feed means 12, its head is received into a gauging aperture defined by the edges of the apertures 49 and 50 of the gauge member D and the straight edge 75 of the fixed gauge block 70, which, as described above, also constitutes a support for the head end of the case. When in inspection position in the gauging device, the lips 50 and 75 fit into the extraction groove of the case while the head of the case is accommodated in the aperture 49. The depth of the aperture 49 of the member D is, as shown in Fig. 3 and mentioned above, sufficiently great to accommodate the head of a case having abnormal head thickness. Thus, if a case having an abnormally thick rim is carried into the gauging aperture, the rim will not be jammed between the rim engaging lips 50 and 75 and the edges 36' of the hole 36. Furthermore, if it happens that there are burrs, dents or other malformations on the rim of the case and especially on that portion of the rim in contact with the gauging lips 50 and 75, the head of the case will, as mentioned above, be capable of a correspondingly slight longitudinal displacement to the left in the aperture 49, see Fig. 3. In either event, when the inspection or gauging rod 18 is carried forwardly by the reciprocating slide 15, the button 22 will stroke the head of the case. If the head is too thick or is slightly displaced by a dent or other malformation on the rim, the gauge rod will be displaced in its sleeve 23 slightly rearward of its normal position thereby rotating the gauging lever 24 counterclockwise and swinging the plug 25 out of line with the aperture 19 of the gauging head 17, thus automatically setting means 20 for rejecting this particular cartridge. Similarly, if the cartridge head is too thin, the gauging rod 18 will be advanced in its sleeve slightly forward of a normal position, and, consequently, the ejection means will be automatically set as described above to eject the cartridge. If the case is of normal head thickness, then the gauging rod 18 will be set at a normal position such that, when the gauging plate 17 advances, the plug 25 of the gauging lever 24 will pass freely into the aperture 19 of the plate. Consequently, the ejecting means is not set for rejecting the cartridge and it passes uninterruptedly through the machine.

What is claimed is:

1. In a machine for gauging rimmed articles, a discoidal member having radial gauging slots; flanges circumscribing said slots; means for feeding rimmed articles successively into said slots to engage the rims of said articles with the flanges of said slots, a gauging element constructed and arranged to be moved into contact with the rim of an article in one of said slots and to be displaced by said rim whenever the point of contact of said element with said rim is greater than a predetermined distance from the flange of said slot; and a member responsive to the displacement of said gauging element to pass or reject said article.

2. In a machine for gauging rimmed articles, a discoidal member having radial gauging slots; flanges circumscribing said slots; means for feeding rimmed articles successively into said slots to engage the inner faces of said rims against the flanges of said slots; a gauging element constructed and arranged to be moved into contact with the outer face of the rim of an article in one of said slots and to be displaced by said rim whenever the outer face thereof is greater than a predetermined distance from the flange of said slot; and a member responsive to the displacement of said gauging element to pass or reject said article.

3. In a machine for gauging rimmed articles, a discoidal member mounted in a substantially vertical plane and having radial gauging slots; flanges circumscribing said slots; means for feeding rimmed articles tangentially into said slots to engage the rims of said articles with the flanges of said slots; a gauging element constructed and arranged to be moved substantially perpendicularly to the plane of said discoidal member into contact with the rim of an article in one of said slots and to be displaced by said rim whenever the point of contact of said element with said rim is greater than a predetermined distance from a flange of said slot; and a member responsive to the displacement of said gauging element to pass or reject said article.

4. In a machine for gauging rimmed articles, a discoidal member rotatable in a substantially vertical plane and having radial U-shaped gauging slots; flanges circumscribing said slots; means for feeding rimmed articles tangentially into said slots to index each slot intermittently to an inspection station and to engage the rim of each article with the flange of its respective slot at said inspection station; a gauging element at said inspection station constructed and arranged to be moved substantially perpendicularly to the plane of said discoidal member into contact with the rim of an article in one of said slots and to be displaced by said rim whenever the point of contact of said element with said rim is greater than a predetermined distance from a flange of said slot; and a member responsive to the displacement of said gauging element to pass or reject said article.

5. In a machine for gauging rimmed articles, a discoidal member rotatable in a substantially vertical plane and having radial U-shaped gauging slots; flanges circumscribing said slots; means for feeding rimmed articles tangentially into said slots to index each slot intermittently to an inspection station and to engage the rim of each article with the flange of its respective slot at said inspection station; a gauging element at said inspection station constructed and arranged to be moved substantially perpendicularly to the plane of said discoidal member into contact with the rim of an article in one of said slots and to be displaced by said rim whenever the point of contact of said element with said rim is greater than a predetermined distance from a flange of said slot; a member responsive to the displacement of said gauging element to pass or reject said articles; and means supplementing said article feeding means to index the slots of said discoidal member to said inspection station.

6. In a machine for gauging rimmed articles, a rotatable discoidal member having radial gauging slots; flanges circumscribing said slots; means for feeding rimmed articles successively into said slots to index said slot intermittently to an inspection station and to engage the rim of each article with the flange of its respective slot at said inspection station; a fixed member at said inspection station having a flange constructed and arranged to supplement the flange of a slot at said station and to be engaged by the rim of an article thereat; a gauging element constructed and arranged to be moved into contact with the rim of an article at said inspection station and to be displaced by said rim whenever the point of contact of said element with said rim is greater than a predetermined distance from the flanges of said slot and said fixed member; and a member responsive to the displacement of said gauging element to pass or reject said article.

7. In a machine for gauging rimmed articles, a rotatable discoidal member having radial gauging slots; flanges circumscribing said slots; means for feeding rimmed articles successively into said slots to index said slot intermittently to an inspection station and to engage the rim of each article with the flange of its respective slot at said inspection station; a fixed member at said inspection station having a flange constructed and arranged to supplement the flange of a slot at said station and to be engaged by the rim of an article thereat; a gauging element constructed and arranged to be moved into contact with the rim of an article at said inspection station and to be displaced by said rim whenever the point of contact of said element with said rim is greater than a predetermined distance from the flanges of said slot and said fixed member; a member responsive to the displacement of said gauging element to pass or reject said article; and a pivoted weight supplementing said article feeding means to index the slots of said discoidal member to said inspection station.

8. In a machine for gauging rimmed articles, a rotatable discoidal member having radial gauging slots and a hub provided with planar surfaces; flanges circumscribing said slots; means for feeding rimmed articles successively into said slots to index each slot intermittently to an inspection station and to engage the rim of an article with the flange of its respective slot at said inspection station; a gauging element constructed and arranged to be moved into contact with the rim of an article in one of said slots and to be displaced by said rim whenever the point of contact of said element with said rim is greater than a predetermined distance from the flange of said slot; a member responsive to the displacement of said gauging element to pass or reject said article; and a pivoted weight constructed and arranged to frictionally engage the planar surfaces of said hub and supplementing said article feeding means to index the slots of said discoidal member to said inspection station.

9. In a machine for gauging head thickness of cartridge cases, a discoidal member having radial U-shaped gauging slots; flanges circumscribing said slots; means for feeding cases tangentially into said slots to index each slot intermittently to a gauging station at which substantially one-half of the circumference of the head of each case engages against the flange of its respective slot; a fixed member at said gauging station having a flange constructed and arranged to be engaged by the head of a case at said station and to subtend an arc of substantially 60° on said head; a gauging element constructed and arranged to be moved into contact with the head of a case at said gauging station and to be displaced by said head whenever said head is of greater than standard thickness; and a member responsive to the displacement of said gauging element to pass or reject said article.

10. In a machine for gauging head thickness of cartridge cases, a discoidal member having radial U-shaped gauging slots; flanges circumscribing said slots; means for feeding cases tangentially into said slots to index each slot intermittently to a gauging station at which substantially one-half of the circumference of the head of each case engages against the flange of its respective slot; a fixed member at said gauging station having a flange constructed and arranged to be engaged by the head of a case at said station and to subtend an arc of substantially 60° on said head; a gauging element constructed and arranged to be moved into contact with the head of a case at said gauging station and to be displaced by said head whenever said head is of greater than standard thickness; a member responsive to the displacement of said gauging element to pass or reject said article; and a pivoted weight supplementing said feeding means to indexing slots of said discoidal member to said gauging station.

ROBERT F. BELVEAL.